United States Patent [19]

Gabas et al.

[11] Patent Number: 5,265,710

[45] Date of Patent: Nov. 30, 1993

[54] HYDRAULIC SELF-ADJUSTING DEVICE FOR CLUTCH CONTROL CABLES

[75] Inventors: Carlos Gabas, Barcelona; Agustin Roca, Rubi, both of Spain

[73] Assignee: Pujol y Tarrago S.A., Rubi, Spain

[21] Appl. No.: 842,382

[22] PCT Filed: Jul. 22, 1991

[86] PCT No.: PCT/ES91/00041

§ 371 Date: Mar. 24, 1992

§ 102(e) Date: Mar. 24, 1992

[87] PCT Pub. No.: WO92/01871

PCT Pub. Date: Feb. 6, 1992

[30] Foreign Application Priority Data

Jul. 26, 1990 [ES] Spain .................... P 9002014

[51] Int. Cl.$^5$ ............................................ F16D 13/75
[52] U.S. Cl. ............................ 192/111 A; 192/109 F;
   188/282; 267/226
[58] Field of Search ............... 192/111 A, 109 F, 995;
   188/282, 317, 322.15; 267/226, 127

[56] References Cited

U.S. PATENT DOCUMENTS

| | | | |
|---|---|---|---|
| 1,445,615 | 2/1922 | Ferres | 188/269 |
| 2,565,617 | 8/1951 | Mercier et al. | 267/226 |
| 2,593,192 | 4/1952 | Rockwell | 192/111 A |
| 2,800,981 | 7/1957 | Allinquant | 188/322.15 |
| 3,111,201 | 11/1963 | Bliven et al. | 267/226 X |
| 3,833,248 | 9/1974 | Wossner et al. | 188/282 X |
| 4,004,662 | 1/1977 | Sorgatz et al. | 188/282 X |
| 4,113,071 | 9/1978 | Muller et al. | 188/282 |
| 4,203,507 | 5/1980 | Tomita et al. | 188/282 |
| 4,735,298 | 4/1988 | Hanguel | 192/111 A |
| 4,952,759 | 8/1990 | Perret | 267/226 X |
| 5,042,625 | 8/1991 | Maus | 188/282 X |
| 5,131,512 | 7/1992 | Steinhilber et al. | 188/282 X |

FOREIGN PATENT DOCUMENTS

| | | |
|---|---|---|
| 0214000 | 3/1987 | European Pat. Off. . |
| 0334808 | 9/1989 | European Pat. Off. . |
| 2145675 | 3/1973 | Fed. Rep. of Germany . |
| 2344693 | 3/1975 | Fed. Rep. of Germany . |
| 3036079 | 5/1982 | Fed. Rep. of Germany . |
| 3602754 | 4/1987 | Fed. Rep. of Germany . |
| 1030849 | 10/1926 | France ........................ 267/226 |
| 2344757 | 10/1977 | France . |
| 2444199 | 7/1980 | France . |
| 2552514 | 3/1985 | France . |
| 0027198 | of 1911 | United Kingdom ........... 267/226 |
| 1512884 | 6/1978 | United Kingdom ........... 188/282 |
| 1547193 | 6/1979 | United Kingdom . |
| 2018933 | 10/1979 | United Kingdom . |

Primary Examiner—Leslie A. Braun
Assistant Examiner—Andrea Pitts
Attorney, Agent, or Firm—Michael J. Striker

[57] ABSTRACT

A hydraulic self-adjusting device for clutch control cables has a main housing, where one of the ends thereof is provided with an end cap and the other rear end is formed with an extension for attachment to the pressure plate fork. The main housing has a channel which through a regulator places the two chambers in communication determining the position of the piston and contains a liquid. An adjusting rod, the end of which projecting to the outside, is attached to the cable linking with the clutch pedal, while the other end is attached to the piston formed by a shut-off valve. A control spring permanently pulls against the said cable through the rod. The portion of the rod contained in the main housing compensate in length the wear of the clutch plate lining.

27 Claims, 8 Drawing Sheets

HYDRAULIC SELF-ADJUSTING DEVICE FOR CLUTCH CONTROL CABLES

BACKGROUND OF THE INVENTION

The present invention relates to a hydraulic self-adjusting device for clutch control cables which, in particular, is applicable as a compensating device for the clutch plate lining wear in motor vehicles.

It is known that operation of a motor vehicle clutch causes continuous wear of the clutch plate lining, involving the need to adjust the pedal travel periodically to maintain it constant and in this way compensate for the said wear. Since these adjusting operations are, in general, costly, there are available self-adjusting devices, installed as original equipment in motor vehicles, which compensate for the clutch plate lining wear by the corresponding variation of the length of the control cable linking the clutch mechanism with the control pedal therefor.

Among the known embodiments of the above mentioned self-adjusting devices, the hydrauliuc devices allow for continuous adjustment of the control cable length without any discontinuity occurring therein, unlike the self-adjusting devices based on the coupling of mutually telescopically sliding members using mechanical toothing for setting the cable length.

The hydraulic self-adjusting devices are attached to the clutch mechanism pressure plate operating fork and compensate for the clutch plate lining wear by increasing, to a corresponding extent, the length of the control cable connecting the self-adjusting device to the clutch pedal, without there being any discontinuity caused in the said control cable, as said above.

Generally speaking, the known hydraulic self-adjusting devices for clutch control cables comprise all or some of the following operating members:

a body member provided with means for attachment thereof to the clutch mechanism pressure plate operating fork and containing a piston fixedly attached to an adjusting rod which is connected at one end thereof to the corresponding end of the control cable extending to the clutch pedal;

a piston with through holes allowing the liquid contained in the device body member to flow therethrough;

and a control spring which permanently bears at one end thereof against the self-adjusting device and which bears at the other end thereof against the corresponding end of the said adjusting rod so as to pull permanently against the control cable.

British patent 2,018,933 for "Hydraulically damped automatic play compensation device for motor vehicle clutches" may be cited as an example of known self-adjusting hydraulic devices for control cable lengths. This comprises all the operating members succinctly described above, apart from its own unique characteristic members.

Generally speaking, the known embodiments of self-adjusting hydraulic devices have a large number of components of complex manufacture and assembly, notably increasing the cost of the finished product. For their very complexity and the working conditions to which they are subject, they cause frequent faults and/or misoperation.

SUMMARY OF THE INVENTION

The new hydraulic self-adjusting device for clutch control cables of the invention provides a new embodiment simplifying the manufacturing and assembly of the component parts, allowing the product cost thereof to be reduced and, simultaneously, improving the performance thereof with regard to reliability of operation.

The hydraulic self-adjusting device for clutch control cables of the invention includes the following known members:

a hollow generally cylindrical elongate main housing having at the two ends, respectively an open front port provided with an end cap and a closed rear extension allowing it to be connected to the clutch mechanism pressure plate operating fork, said main housing containing a liquid;

a piston contained in the main housing and capable of adjustably sliding along a portion delimited by two terminal stop positions and which allows the fluid contained in the main housing to flow therethrough through a pertinent passage;

an adjusting rod, having one end thereof passing through the closed rear extension of the main housing and attached to the corresponding end of the control cable connecting with the clutch mechanism operating pedal;

and a control spring permanently urging the adjusting rod so that the clutch mechanism control cable is pulled;

In accordance with the invention, it has the following new elements:

the adjusting rod extends to the outside only at the rear end of the main housing, the other end of said rod remaining permanently in the main housing fixedly attached to the piston;

the passage in the piston for fluid flow therethrough is provided with a shut-off valve formed by a passage member fixedly attached to the adjusting rod and by a shut-off member which may cut off the fluid flow through the passage member depending on the movements of the adjusting rod, and said shut-off member may be complemented operatively with an opening spring;

and the control spring is contained in the main housing coaxially with the adjusting rod, with one end bearing against the bottom of the inside rear end of said housing so that the other end permanently urges the adjusting rod either directly or by bearing first against the piston attached to the rod.

The main housing may be integral or may be formed by several assembled components.

The hydraulic self-adjusting device of the invention is also characterised in that the main housing comprises internally a longitudinal conduit-like orifice, both ends of which place the two chambers defined one at each side in the main housing by the piston in communication with each other, and also comprises an adjusting valve mounted in a transverse through hole crossing through the outside wall of the main housing, wherein the conduit and the inside wall of the main housing establish communication between the outside and inside of the main housing in the chamber situated between the rear end thereof and the piston.

According to a further feature of the device of the invention, the end cap of the main housing may comprise a compensator for the variations of volume caused in the interior of the main housing by the length variation of the portion of the adjusting rod contained in the main housing during the operation of the device.

According to a further feature, said compensator comprises an axial hole housing a spring and a piston where the ends of the spring bear permanently against the base defining the hole and against the piston, respectively, such that the said piston compresses the fluid contained in the main housing through a membrane.

It is also a feature of the device of the invention that the adjusting rod may be provided on the internal portion thereof having the end attached to the piston with an annular flange which serves, in certain embodiments, as a support surface for the control spring to bear and this annular flange may also be used to limit the movement of the shut-off valve shut-off member.

The inner end of the adjusting rod is formed with a screw thread for attachment to the shut-off valve passage member and, in association therewith, there may be a smaller diameter portion defining a step which, in certain embodiments, serves to define the movements of the shut-off valve. The shut-off member and this step may also be used to urge the shut-off member against the valve passage member.

According to one embodiment, the component members of the shut-off valve have the following features:
- the passage member is essentially cylindrical and is attached to the adjusting rod by means of an axial hole provided with a screw thread and is formed, laterally, with a concentric groove housing a sealing gasket and, at the end facing the adjusting rod, with a smaller diameter cylindrical extension, said passage member having a sufficient number of longitudinal through holes equidistant from the centre line thereof and centered around the base of said extension;
- the shut-off member is essentially cylindrical and is disposed coaxially around the adjusting rod on which it may slide and is formed, laterally, with a perimetral flange and, at the end facing the passage member, with a coaxial groove snugly housing a sealing gasket which may seal the through holes of the passage member;
- and the opening spring is disposed coaxially around the adjusting rod between the passage and shut-off members so that one of the ends thereof bears against the passage member on the step defined by the cylindrical extension with which it is formed and the other end thereof bears against the perimetral flange of the shut-off member.

According to a further embodiment, the component members of the shut-off valve have the following features:
- the passage member is formed by a base member and by a guide member, both essentially cylindrical and mutually engageable by way of corresponding screw threads, the guide member being attached to the adjusting rod by way of an axial hole provided with a screw thread;
- the base member is formed, laterally, with a concentric groove housing a sealing gasket and, longitudinally, with a through hole defining four cylindrical portions of decreasing diameter, the first largest diameter portion being provided with a screw thread and housing the guide member, the second and third portions containing the shut-off member and the opening spring, respectively, and the fourth portion is the fluid passage portion, with the entry to the third portion forming a closing seat;
- the guide member is formed, laterally, with a screw thread and, longitudinally, with a sufficient number of through holes establishing communication between the main housing chamber adjacent thereto and the second portion of the base member through hole and, at the end facing the base member with an axial hole partly housing the shut-off member;
- the shut-off member has a surface of revolution, is essentially cylindrical and is formed at the end facing the base member with a profile functionally mating with the closing seat formed on the entry to the third portion;
- and the opening spring constantly presses against the bottom of the third portion and the corresponding end of the shut-off member.

According to a further embodiment the component members of the shut-off valve have the following features:
- the passage member is essentially cylindrical and is attached to the adjusting rod by means of an axial hole provided with a screw thread and is formed, laterally, with a concentric groove housing a sealing gasket and longitudinally, with a sufficient number of through holes for guiding the shut-off member and one or more through holes each formed by two cylindrical portions of different diameter joined by a frustoconical portion forming a closing seat;
- the shut-off member is essentially cylindrical and is disposed coaxially around the adjusting rod on which it may slide and is formed, on the side facing the passage member, with guide pins in the same number as the through holes provided for that purpose in the passage member and a closing pin for each through hole, the free end of which is conical mating with the respective closing seat formed on the passage member;
- and the opening spring is disposed, like the shut-off member, coaxially around the adjusting rod so that the ends thereof bear permanently against the passage and shut-off members, respectively.

According to another embodiment, the component members of the shut-off valve are provided with the following features:
- the passage member is essentially cylindrical and is attached to the adjusting rod by means of an axial hole provided with a screw thread and is formed, laterally, with a concentric groove containinga sealing gasket and, at the end facing the adjusting rod, with a frustoconical inlet hole forming a closing seat, the passage member having a sufficient number of longitudinal through holes extending between the bottom of the frustoconical inlet hole and the opposite end of the passage member;
- the shut-off member is essentially cylindrical and is disposed coaxially around the adjusting rod on which it may slide and is formed, laterally, with a frustoconical surface mating with the closing seat formed on the passage member and, on the side facing said passage member with an axial cylindrical flange;
- and the opening spring is disposed coaxially around the adjusting rod between the passage and shut-off members so that one of the ends thereof bears permanently against the bottom of the frustoconical inlet hole of the passage member and the other end against the step defined by the axial cylindrical flange of the shut-off member.

According to a further embodiment, the component members of the shut-off valve have the following features:

the passage member is essentially cylindrical and is attached to the adjusting rod by means of an axial hole provided with a screw thread and is formed, laterally, with a sufficient number of longitudinal grooves;

and the shut-off member, which is attached to the passage member and is disposed coaxially around the adjusting rod, is essentially cylindrical and is formed, at the end facing the passage member with a cylindrical portion of smaller diameter which may snugly house and retain a resilient material sealing gasket which may, by resilient deformation, press against the inner wall of the main housing, preventing liquid flow between the chambers.

The last described embodiment of the shut-off valve admits as a possible alternative the addition of a thrust member which, while the valve is in operation, presses against the sealing gasket thereby increasing the pressure of the latter against the inner wall of the main housing. The thrust member is essentially cylindrical and disposed coaxially around the adjusting rod on which it may slide and which is formed, laterally, with a frustoconical surface functionally mating with the sealing gasket and, at the end facing the shut-off member, with an axial hole housing an opening spring disposed coaxially around the adjusting rod so that one of the ends thereof permanently presses against the shut-off member and the other end presses against the bottom of the axial hole housing it.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE EMBODIMENT

Figure 1:
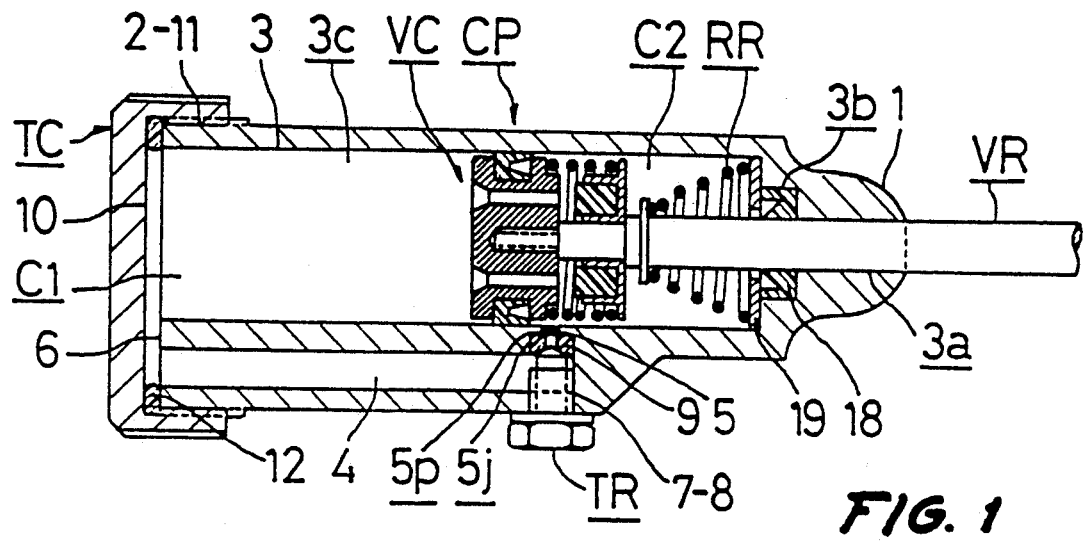
FIG. 1 is a cross section view of the device of the invention, showing the position occupied by the piston when the device is supplied from origin with the control spring compressed.

The hydraulic self-adjusting device for clutch control cables of the invention described as an embodiment thereof comprises, as shown in FIGS. 1, 2, 4, 5, 7, 8, 9, 10 and 11 of the drawing sheets, the following elements:

the main housing CP;

the end cap TC of the main housing CP;

the adjusting rod VR, the outwardly projecting end portion of which is connected to the control cable extending to the clutch pedal which, for greater clarity, have not been illustrated in the drawing sheets;

the shut-off valve VC forming the device piston;

and the control spring RR.

FIGS. 1, 2, 4, 5, 7, 8 and 9 show one embodiment of the main housing CP of the device of the invention. This embodiment of the main housing CP corresponds to the cases in which the device is supplied from origin with the control spring RR compressed.

In this case, i.e. with the control spring RR compressed, the self-adjusting device of the invention may be used for the initial adjustment of the length of the sheathed steel cable connecting the clutch mechanism with the operating pedal therefor when it is mounted in the vehicle.

Figure 10:
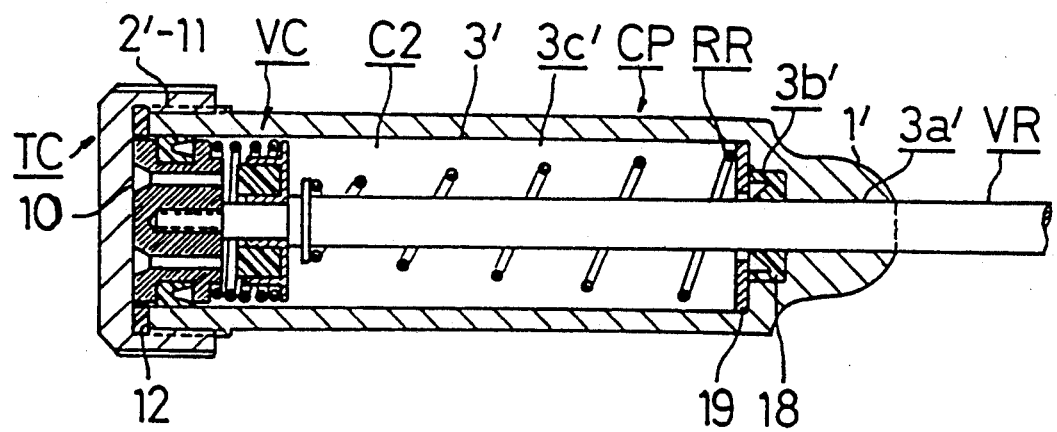
FIG. 10 is a cross section view of the device of the invention, showing the position occupied by the piston when the device is supplied from origin with the control spring extended.
Figure 11:
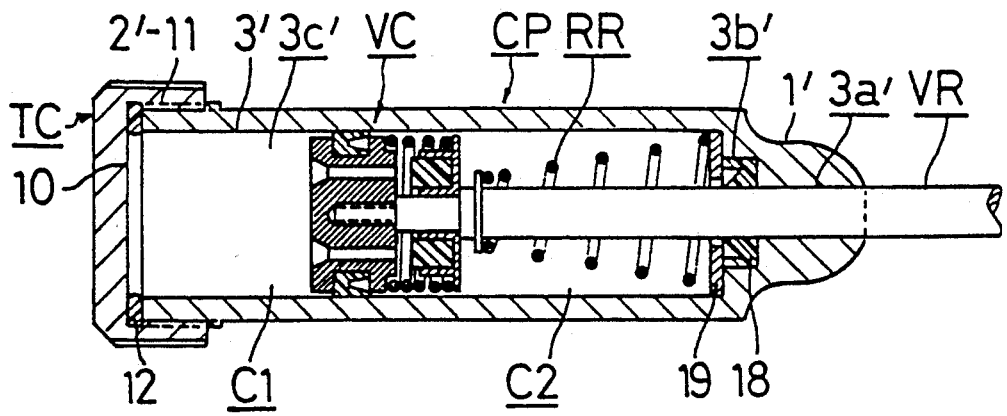
FIG. 11 is a cross section view of the device of the invention, showing the position occupied by the piston when the clutch plate lining has been worn down to some extent.

FIGS. 10 and 11 show another embodiment of the main housing CP of the self-adjusting device of the invention. This embodiment of the main housing CP corresponds to the cases in which the device is supplied from origin with the control spring RR extended.

In this other case, i.e. with the control spring RR extended, the initial adjustment of the length of the sheathed cable connecting the the clutch mechanism with the operating pedal therefor will require the use of an additional length adjusting device. Any pertinent type of adjusting device from those available on the market may be used for this purpose. The said adjusting device has not been shown in the drawing sheets for similar reasons to those given above.

Both forms of main housing CP of the self-adjusting device of the invention comprise equivalent members which, for greater clarity of description, will use as identification, both in the specification and in the drawings the same reference symbols, the members corresponding to the main housing CP illustrated in FIGS. 10 and 11 being differentiated with the prime (') notation.

The main housing CP shown in FIGS. 1, 2, 4, 5, 7, 8, 9, 10 and 11 is essentially cylindrical and is formed at one of the ends thereof with the extension 1,1' for attachment of the self-adjusting device to the the clutch mechanism pressure plate operating fork, which has not been shown in the drawings for the same reasons as those given above, while the opposite end is provided with an external screw thread 2,2' for mounting of the end cap TC.

FIGS. 1, 2, 4, 5, 7, 8, 9, 10 and 11 show how the main housing CP is provided with the longitudinal through hole 3,3' which is formed with three cylindrical portions of progressively increasing section 3a,3a', 3b,3b' and 3c,3c', the smallest diameter portion being disposed in the end formed with the extension 1,1'.

The first portion 3a,3a' is the smallest diameter portion and the adjusting rod VR may slide snugly therethrough and project therefrom to the outside. The second portion 3b,3b' is an intermediate portion. The third portion 3c,3c' is the largest diameter portion and the shut-off valve VC attached to the inner end of the adjusting rod VR may slide snugly therein.

According to the embodiment of the main housing CP shown in FIGS. 1, 2, 4, 5, 7, 8 and 9, it is formed with the longitudinal passage 4 through which communication may be established between the chambers c1 and c2 defined in the portion 3c of the through hole 3 depending on the position occupied by the shut-off valve VC. The main housing CP may be integral, as shown in the drawings, or may be formed by several assembled parts.

Communication between the chambers c1 and c2 over the passage 4 is through the through hole 5 which is formed with two stepped cylindrical portions 5p and 5j and through the notch 6 which is formed in the inner wall separating the passage 4 from the portion 3c of the hole 3. The through hole 5 and notch 6 are situated, respectively at the inner and initial ends of the passage 4.

The communication between the passage 4 and the outside of the device is achieved through the through hole 7 facing the hole 5. The hole 7 is formed with a screw thread 8 allowing the control screw TR to be mounted.

The control screw TR acts as a line valve and allows the flow of the fluid contained in the main housing CP between the chambers c1 and c2 to be established externally through the portions 5p-5j of the hole 5, passage 4 and notch 6. The inner end of the screw TR is arranged as the sealing seat of the gasket 9 suitably housed in the portion 5j of the hole 5.

According to one embodiment shown in FIGS. 1 to 11, the end cap TC is essentially cylindrical and is formed with an axial recess 10 provided with a screw thread 11 allowing it to be mounted on the main housing CP by way of the screw thread 2,2' formed on the latter.

The tightness of the fitting between the end cap TC and the main housing CP is ensured by the gasket 12 which, when both parts are fitted together, is under compression, thereby preventing leaking or loss of the liquid contained inside the said housing CP.

Figure 17:
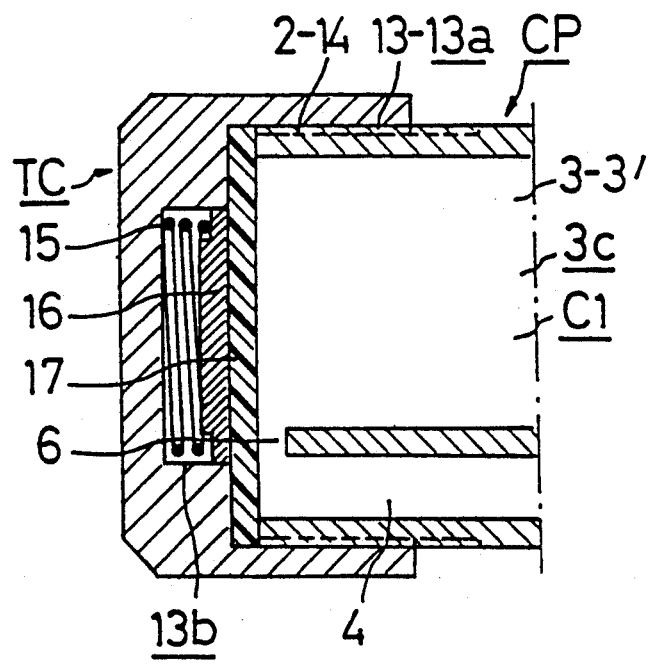
FIGS. 17 an 18 are cross section views of the compensator which may be incorporated in the end cap of the device.
Figure 18:
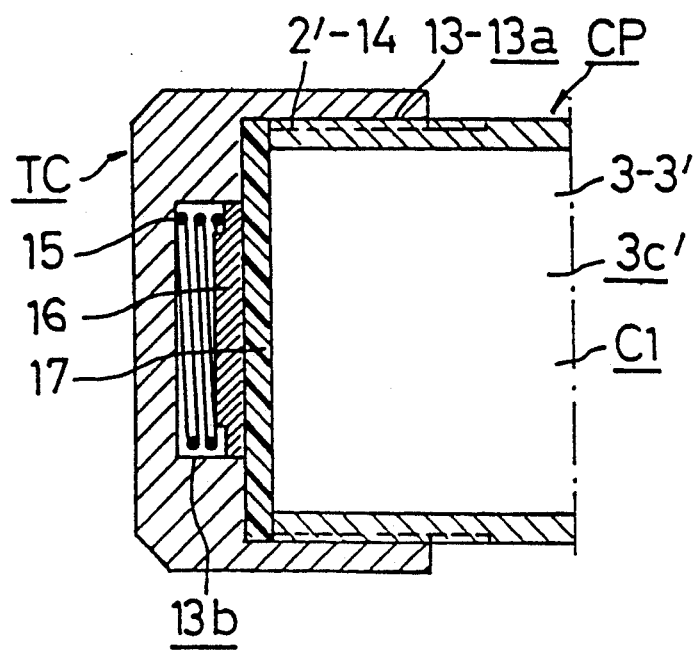

FIGS. 17 and 18 show a further embodiment of the end cap TC designed to compensate the volume variations caused in the portion 3c,3c' of the hole 3,3' of the main housing CP by variation of the length of the portion of the adjusting rod VR contained in said portion 3c,3c'.

According to this further embodiment, the end cap TC is essentially cylindrical and is formed with an axial recess 13 constituted by two cylindrical portions of different section 13a-13b. The larger section, 13a is proovided with a screw thread 14 allowing the end cap TC to be fitted to the main housing CP by way of the screw thread 2—2' of the latter and the smaller diameter portion 13b snugly houses the compensating spring 15 and the plunger 16.

FIGS. 17 and 18 show how, when the end cap TC is attached to the main housing CP, the compensating spring presses 15 permanently at one end thereof against the end wall of the cylindrical portion 13b and at the other end thereof against the plunger 16, so that the plunger constantly compresses the liquid contained in the main housing CP through the membrane 17.

The membrane 17, which is peripherally held compressed by the main housing CP also serves the purpose of sealing gasket preventing leaks of the liquid contained in the said main housing CP.

The adjusting rod VR is essentially cylindrical and extends to the outside at one end thereof through the portion 3a—3a' of the through hole 3—3' of the main housing CP as said above. The passage to the outside is sealed by a gasket 18 housed in the intermediate portion 3b—3b' of the said hole 3.

So that the gasket 18 may not come out of its housing in the portion 3b—3b' of the hole 3—3' when the device is in use, there is disposed against the end wall of the portion 3a—3a' of the hole 3—3' the washer 19 against which one end of the control spring RR permanently bears.

For greater clarity of description, the members or constituent parts of the adjusting rod VR of the embodiments shown in the drawing sheets have the same reference number in all cases where said members or constituent parts have the same purpose.

According to one embodiment of the adjusting rod VR shown in FIGS. 1 to 11, 14 and 16, and shown in detail in FIGS. 3, 6, 14 and 16, the inner end of the rod VR is formed with a screw thread 20 for attachment to the shut-off valve VC and a smaller diameter cylindrical portion 21 defining the step 22. The rod VR has the washer 23 fixedly attached thereto and against which the corresponding end of the control spring RR bears.

Figure 12:
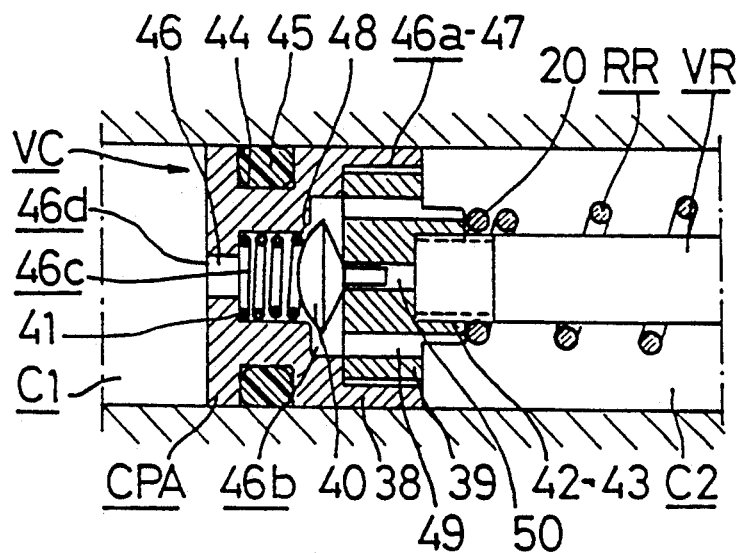
FIGS. 12, 13, 14, 15 and 16 are cross section views respectively showing different embodiments of the shut-off valve.

According to a further embodiment of the adjusting rod VR shown in FIG. 12, the inner end of the rod VR is formed with the screw thread 20.

Figure 13:
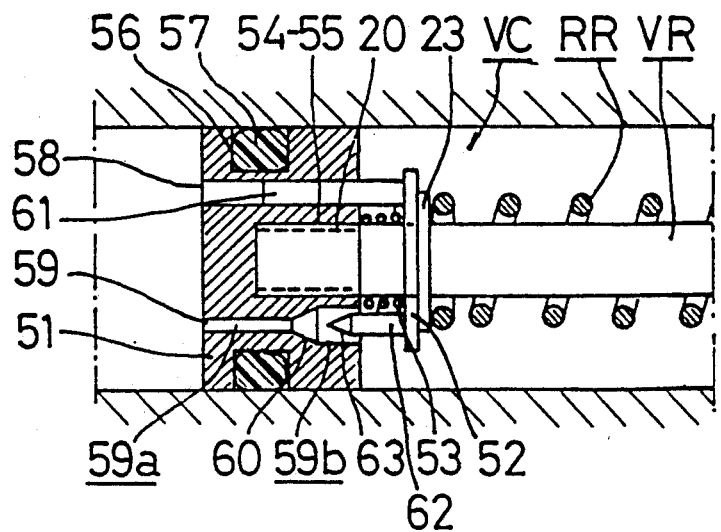

According to another embodiment of the adjusting rod VR shown in FIG. 13, the inner end of the rod VR is formed with the screw thread 20 and incorporates a fixedly attached washer 23.

Figure 15:
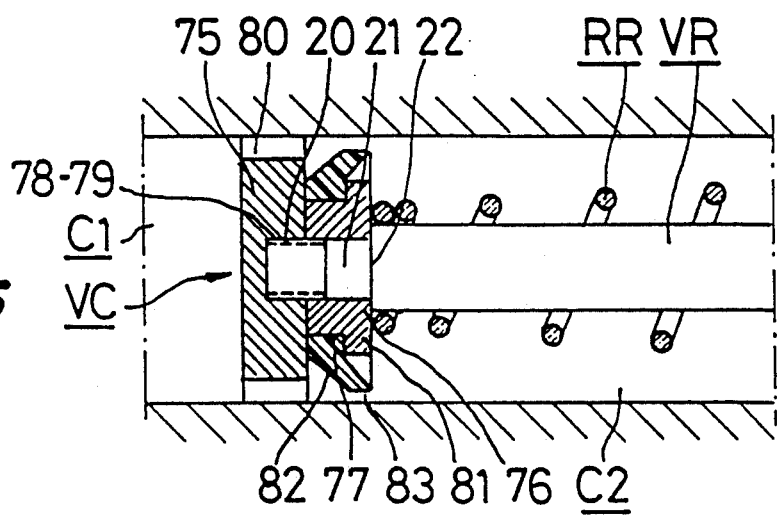

According to another embodiment of the adjusting rod VR shown in FIG. 15, the inner end of the rod VR is formed with the screw thread 20 and the smaller diameter cylindrical portion 21 defining the step 22.

Figure 2:
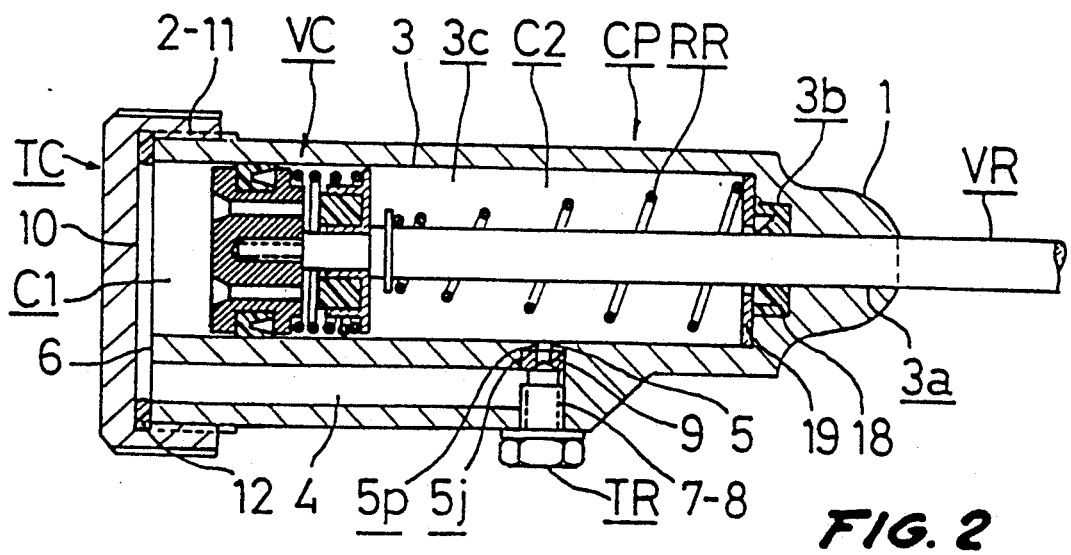
FIG. 2 is a cross section view of the device of the invention showing the position occupied by the piston with the device newly installed in the motor vehicle.
Figure 3:
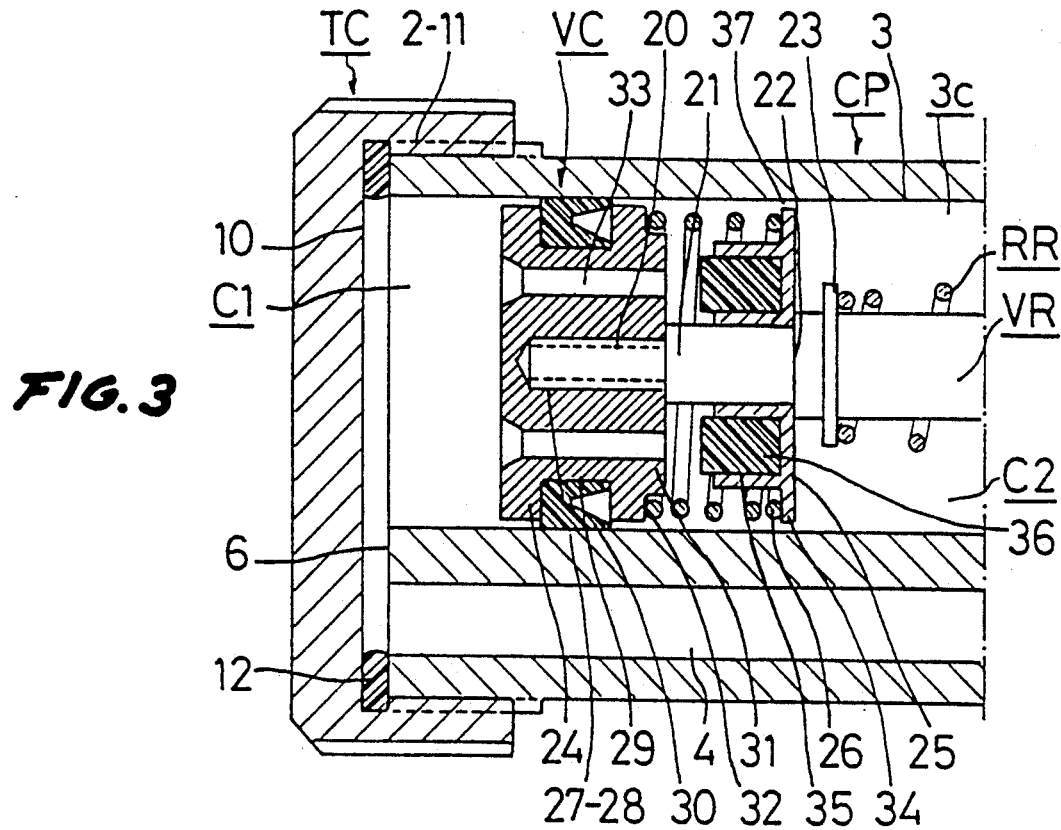
FIG. 3 is an enlarged cross section view of one embodiment of the shut-off valve.
Figure 4:
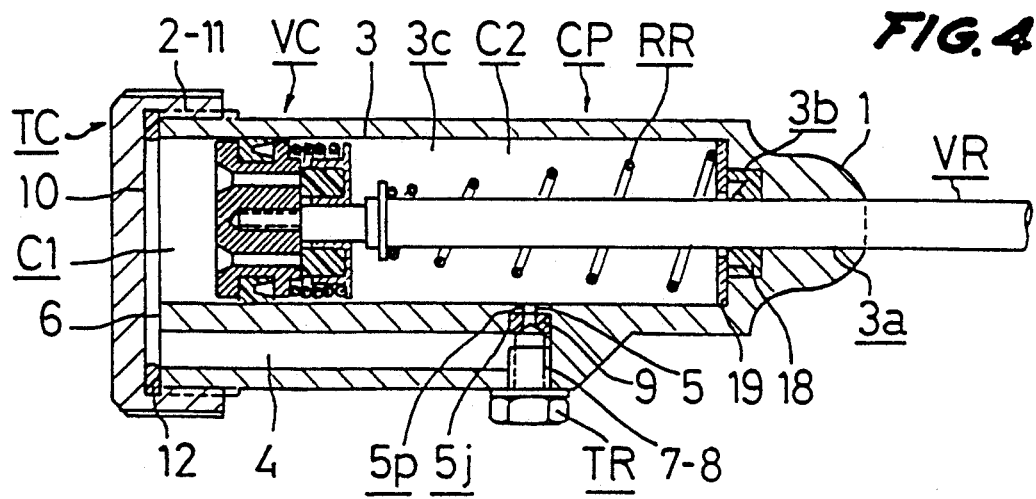
FIG. 4 is a cross section view of the device of the invention, showing the action of the shut-off valve when the clutch pedal is operated.
Figure 5:
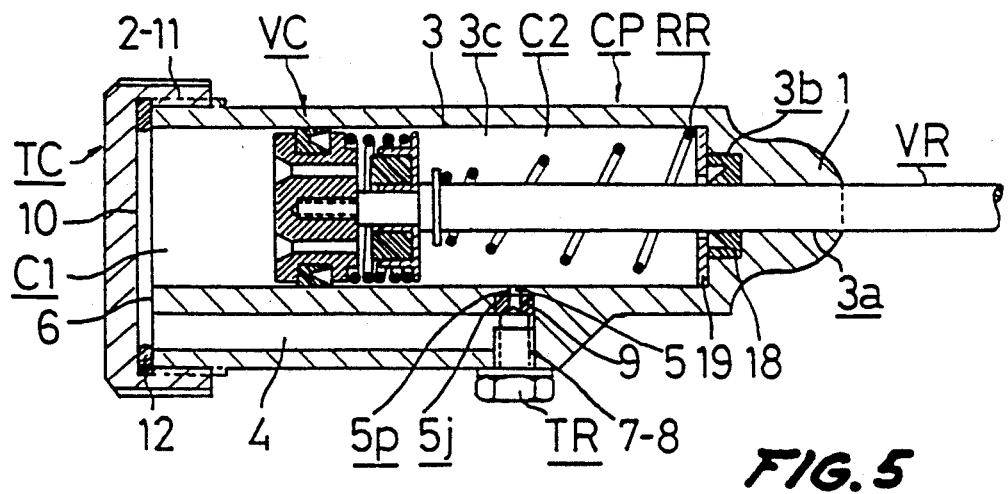
FIG. 5 is a cross section view of the device of the invention, showing the position occupied by the piston when the clutch plate lining has been worn down to some extent.
Figure 6:
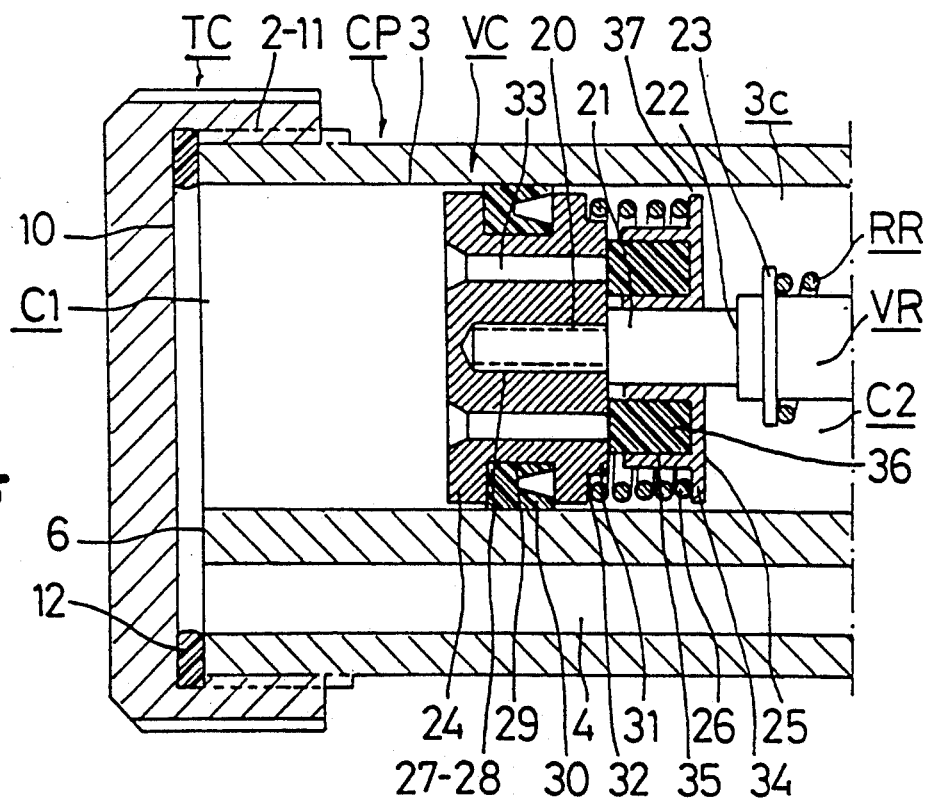
FIG. 6 is an enlarged cross section view of one embodiment of the shut-off valve.

FIGS. 1 to 11 and, in greater detail, FIGS. 3 and 6, shows the preferred embodiment of the shut-off valve VC, which
- includes the passage member 24,
- the shut-off member 25,
- and the opening spring 26.

FIGS. 3 and 6 show how the passage member 24 is essentially cylindrical and is attached to the inner end of the adjusting rod VR by way of the axial hole 27 provided with the corresponding screw thread 28.

The passage member 24 is formed
- laterally, with the concentric groove 29 housing a sealing gasket 30 preventing fluid communication between the chambers c1 and c2 through the fit between the through hole 3—3' of the main housing CP and the passage member 24;

At the end facing the adjusting rod VR it is formed with the smaller diameter cylindrical extension 31 defining the step 32

Internally it is formed with the longitudinal through holes 33 centered on the base of the extension 31 and equidistant from the longitudinal axis of the passage member 24.

The shut-off member 25 is essentially cylindrical and is disposed coaxially around the adjusting rod VR on which it may slide. The sliding is limited by the passage member 24 and the step 22 formed on said rod VR.

The shut-off member 25 is formed laterally with a perimetral flange 34

At the end facing the passage member 24, it is formed with a coaxial groove 35 snugly housing the sealing gasket 36 which is so dimensioned that when the shut-off valve VC is in the closed position, it blocks the through holes 33 formed in said passage member 24, as shown in FIG. 6.

The opening spring 26, coaxially disposed around the adjusting rod VR between the passage member 24 and shut-off member 25 presses permanently, at one end, against the step 32 of the passage member 24 and at the other end against the inner surface of the perimetral flange 34 of the shut-off member 25 so that, when the valve VC is in the open position as shown in FIG. 3, the chambers c1 and c2 are in communication with each other through the holes 33 formed in the passage member 24 and the hole 37 defining the diameter difference provided therefor between the shut-off member 25 and the through hole 3—3' of the main housing CP.

According to another embodiment shown in FIG. 12, the shut-off valve VC is formed by the passage member CPA composed, in turn, of the base member 38 and of the guide member 39, both essentially cylindrical and mutually connectable together by way of corresponding screw threads formed thereon;

the shut-off member 40;

and the opening spring 41.

The passage member CPA is attached to the inner end of the adjusting rod VR by means of the through hole 42 provided with the corresponding screw thread 43 which are both formed in the guide member 39.

The base member 38 is formed laterally, with a concentric groove 44 housing the sealing gasket 45 preventing fluid communication between the chambers c1 and c2 through the fit between the through hole 3—3' of the main housing CP and the base member 38. It is also formed lengthwise, with the through hole 46 defining four cylindrical portions 46a, 46b, 46c and 46d of decreasing diameter stepwise. The first largest diameter portion, 46a, is formed with the screw thread 47 for connection of the guide member 39, the second and third portions 46b and 46c contain the shut-off member 40 and the opening spring 41, respectively, and the fourth portion 46d is the fluid passage, with the entrance to the third portion 46c forming the closing seat 48.

The guide member 39 is also formed with the through holes 49 which, in a sufficient number, place the chamber c2 and the second, cylindrical portion 46b which, as said above, contains the shut-off member 40, in communication;

and the axial hole 49, in which the shut-off member 40 may slide.

The shut-off member 40 is essentially cylindrical and is formed at the end facing the base member 38 with a profile functionally mating with the closing seat 48 forming the entry to the third cylindrical portion 46c, of the base member 38.

The opening spring 41 presses permanently, at one end, against the end wall of the cylindrical portion 46c and at the other end against the corresponding end of the shut-off member 40 so that, when the valve VC is in the open position, as shown in FIG. 12, the chambers c1 and c2 are in communication with each other through the cylindrical portions 46b, 46c, 46d and the holes 49 formed in the base member 38 and in the guide member 39, respectively.

FIG. 13 shows a further embodiment of the closing valve VC, which comprises the passage member 51;

the shut-off member 52;

and the opening spring 53.

The passage member 51 is essentially cylindrical and is attached to the inner end of the adjusting rod VR by means of the axial hole 54 provided with the corresponding screw thread 55.

The passage member 51 is formed laterally with the concentric groove 56 housing the sealing gasket 57 preventing the passage of liquid between the said chambers c1 and c2 through the fit between the hole 3—3' of the main housing CP and the passage member 51. It is also formed internally, with the longitudinal through hole 58 acting as guide for the shut-off member 52 and the longitudinal through hole 58 defining the two cylindrical portions 59a and 59b which are connected by the frustoconical portion 60 acting as a closing seat for the shut-off member 52.

The shut-off member 52 is essentially cylindrical and may slide coaxially around the adjusting rod VR. This sliding is limited by the passage member 51 and by the washer 23 mounted on the said adjusting rod VR.

As shown in FIG. 13, the shut-off member 52 is formed, on the surface facing the passage member 51 with a cylindrical extension 61 which may snugly slide guidingly in the through hole 58 formed in the passage member 51;

and with a cylindrical extension 62, diametrally opposite to the previous extension 61, the free end of which is formed with a conical portion 63 functionally mating with the frustroconical portion 60 of the through hole 59 of the passage member 51.

The opening spring 53 is disposed coaxially around the adjusting rod VR between the said passage member 51 and shut-off member 52. Its both ends press permanently respectively against the said members 51 and 52 so that, when the valve VC is in the open position, as shown in FIG. 13, the chambers cl and c2 are in communication with each other through the through hole 59 formed in the passage member 51.

Figure 14:
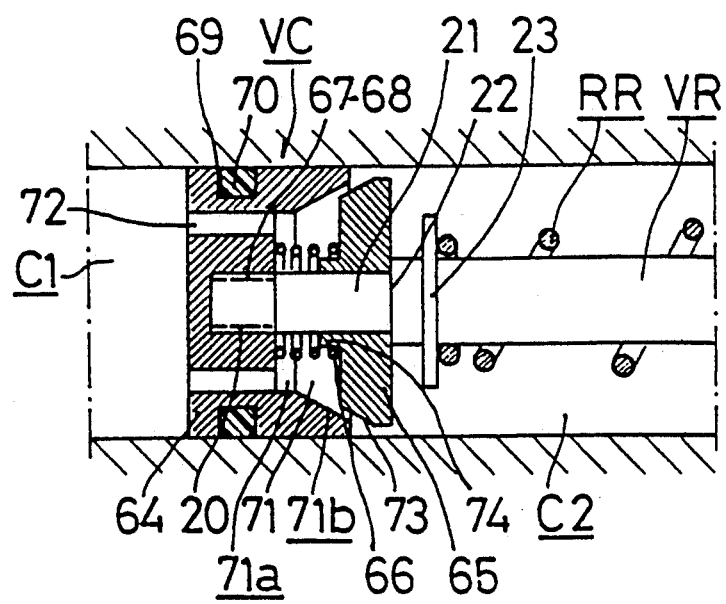

FIG. 14 shows another embodiment of the shut-off valve VC which comprises the passage member 64;

the shut-off member 65;

and the opening spring 66.

The passage member 64 is essentially cylindrical and is attached to the adjusting rod VR by means of the axial hole 67 provided with the corresponding screw thread 68.

The passage member is formed
laterally with the concentric groove 69 housing the sealing gasket 70 preventing the passage of liquid between the chambers c1 and c2 through the fit between the hole 3—3' of the main housing CP and the passage member 64. It is also formed
internally, at the end facing the shut-off member 65, with a hole 71 defining the inner cylindrical portion 71a and the outer frustoconical portion 71b. The latter forms the closing seat of the shut-off member 65 and with a sufficient number of longitudinal through holes 72 centred around the base of the said cylindrical portion 71a.

The shut-off member 65 is essentially cylindrical and may slide coaxially around the adjusting rod VR. This sliding is limited by the passage member 64 and by the step 22 formed on the rod VR.

The shut-off member 65 is formed
laterally, with a frustroconical surface 73 functionally mating with the frustoconical portion 71b of the hole 71 of the passage member 64;
and, on the side facing the passage member 64, with a cylindrical coaxial flange 74 acting as a guide for the opening spring 66.

The opening spring 66 is disposed coaxially around the adjusting rod VR between the said passage member 64 and shut-off member 65 and presses permanently at one end against the bottom of the cylindrical portion 71a of the hole 71 and at the other end against the shut-off member 65. This end is guided by the cylindrical coaxial flange 74 of the said shut-off member 65.

When the shut-off valve VC is in the open position, as shown in FIG. 14, the chambers c1 and c2 are in communication with each other through the holes 71 and 72 formed in the passage member 64.

According to another embodiment shown in FIG. 15, the shut-off valve VC is formed by
the passage member 75;
the shut-off member 76;
and by the sealing gasket 77 disposed between the said passage member 75 and shut-off member 76 and compressed thereby.

The passage member 75 is attached to the inner end of the adjusting rod VR by means of the axial hole 78 provided with the corresponding screw thread 79.

The passage member 75 is essentially cylindrical and is formed laterally with a sufficient number of longitudinal grooves 80.

The shut-off member 76 is essentially cylindrical and is formed laterally, at the end facing the adjusting rod VR, with the perimetral flange 81. With the inner end of the adjusting rod VR being attached to the passage member 75, the step 22 formed on the adjusting rod VR presses against the shut-off member 76 so that, as said above, the sealing gasket 77 is compressed by the perimetral flange 81 of the shut-off member 76 and the passage member 75.

The sealing gasket 77 is essentially cylindrical and is formed laterally with the hollow frustoconical perimetral extension 82. Its free end faces the chamber c2 so that is may press against the wall of the hole 3—3' of the main housing CP by resilient deformation when the adjusting rod VR is moved.

When the shut-off valve VC is in the open position, as shown in FIG. 15, the chambers c1 and c2 are in communication with each other through the longitudinal grooves 80 and passage 83 defining the diameter difference provided for such purpose between the sealing gasket 77 and the hole 3—3' of the main housing CP.

The embodiment of the shut-off valve VC described in the immediately foregoing paragraphs and shown in FIG. 15, alternatively omits the addition of a thrust member for reinforcing the action of the sealing gasket on the wall of the hole 3—3' of the main housing CP during the closing operation of the valve VC and the addition of an opening spring.

Figure 16:
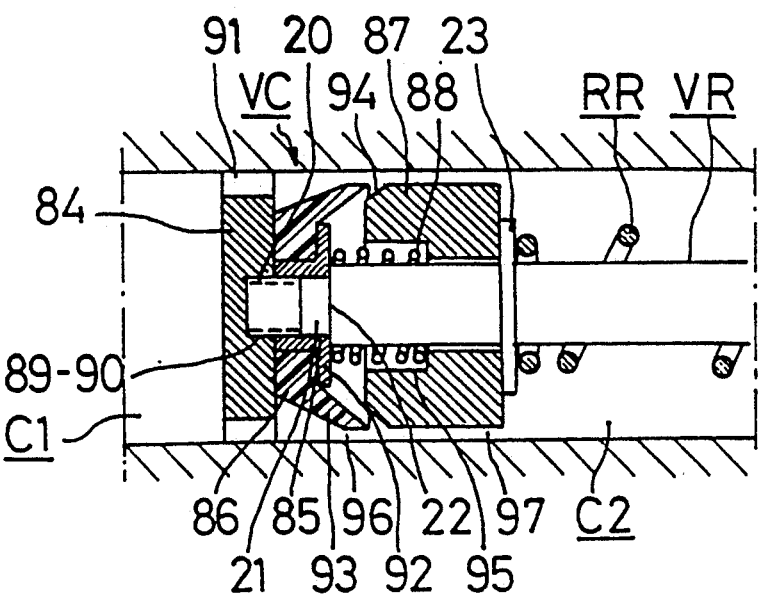

On the basis of the foregoing, FIG. 16 illustrates a further embodiment of the shut-off valve VC, which is composed by
the passage member 84;
the shut-off member 85;
the sealing gasket 86, disposed between the said passage member 84 and shut-off member 85 and compressed thereby;
the thrust member 87;
and by the opening spring 88.

The passage member 84 is attached to the inner end of the adjusting rod VR by means of the axial hole 89 provided with the corresponding screw thread 90.

The passage member 84 is essentially cylindrical and is formed laterally with a sufficient number of longitudinal grooves 91.

The shut-off member 85 is essentially cylindrical and is formed laterally, at the end facing the adjusting rod VR, with the perimetral flange 92. In a similar way as described in the previous embodiment of the shut-off valve VC, with the adjusting rod VR being attached to the passage member 84, the step 22 formed on the adjusting rod VR presses against the shut-off member 85 so that the sealing gasket 86 is compressed by the perimetral flange 92 of the shut-off member 85 and the passage member 84.

The sealing gasket 86 is essentially cylindrical and is formed laterally with the hollow frustoconical perimetral extension 83. Its free end faces the the chamber c2 so that is may press against the wall of the hole 3—3' of the main housing CP by resilient deformation when the adjusting rod VR is moved.

The thrust member 87 is essentially cylindrical and may slide coaxially around the adjusting rod VR. This sliding is limited by the shut-off member 85 and by the washer 23 mounted on the adjusting rod VR. The thrust member is formed
laterally, at the end facing the shut-off member 85, with a frustoconical portion 94 functionally mating with the extension 93 of the sealing gasket 86;
and also with an axial hole 95 housing the opening spring 88 at the end facing the shut-off member 85.

The opening spring 88 is disposed coaxially around the adjusting rod VR between the shut-off member 85 and the thrust member 87 and presses permanently at one end against the said shut-off member 85 and at the other end against the bottom of the hole 95 of the thrust member 87.

When the shut-off valve VC is in the open position, as shown in FIG. 16, the chambers c1 and c2 are in communication with each other through the longitudinal grooves 91 and passages 96 and 97 defining the diameter difference provided for such purpose between the hole 3—3' of the main housing CP and the sealing gasket 86 and the thrust member 87, respectively.

As shown in FIGS. 1 and 2, 4 and 5 and 7 to 11, the control spring RR is disposed coaxially around the adjusting rod VR and presses permanently at one end against the washer 19 disposed against the end wall of the portion $3a$—$3a'$ of the hole $3$—$3'$ of the main housing CP as described above. At the other end according to the embodiments of the shut-off valve shown in detail in FIGS. 3-6, 13, 14 and 16, it presses against the washer 23 mounted on the adjusting rod VR. According to the embodiment of the shut-off valve VC shown in FIG. 12, it presses against the passage member CPA of the shut-off valve VC, with the guide member 39 intermediate thereto According to the embodiment of the shut-off valve VC shown in FIG. 15, it presses against the shut-off member 76, respectively, of the said valve VC.

As described above, FIGS. 1, 2, 4, 5, 7, 8 and 9 show the embodiment of the hydraulic self-adjusting device for clutch control cables according to the invention in which the device is supplied from origin with the control spring RR compressed. This embodiment also incorporates the preferred embodiment of the shut-off valve VC shown in detail in FIGS. 3 and 6.

Under these premises, the device of the invention operates as follows:

FIG. 1 shows how the self-adjusting device is supplied from origin with the control spring RR compressed. Under these conditions, the shut-off valve VC is held open by the action of the opening spring 26 on the shut-off member 26, the chambers $c_1$ and $c_2$ being in communication with each other by means of the through holes formed in the passage member 24 as shown in FIG. 3, with the control screw TR preventing the passage of fluid between the chambers $c_1$ and $c_2$ through the passage 4 formed in the main housing CP.

It has also been described above that, with the control spring RR compressed, the device of the invention may be used for the initial adjustment of the length of the sheathed steel cable connecting the clutch mechanism to the operating pedal therefor. In this respect, with the device mounted on the operating fork of the pressure plate, FIG. 2 shows the position occupied by the valve VC when the adjusting rod VR is released from the action of the retaining means, not shown in the drawing, provided for the purpose and is engaged by the spring RR. the increase of the portion of the rod VR inside the main housing CP corresponds to the absorption of the length of sheathed steel cable.

FIG. 4 shows the closing action of the valve VC when the clutch pedal is operated. In fact, when the adjusting rod VR is pulled, the fluid contained in the chamber $c_2$ drives the shut-off member 25 against the passage member 24 so that the sealing gasket 36 seals the through holes 33 of the passage member 24 and, consequently, the device as a whole moves fixedly with the operating fork.

When the adjusting rod VR is not pulled by the action of the clutch pedal, the portion of the rod VR inside the main housing CP will depend on the wear of the clutch plate lining, as shown in FIG. 5, where the valve VC occupies an intermediate position between the two end positions shown in FIGS. 1 and 2.

This embodiment of the device of the invention retains all the services listed above even when the device has to be removed from its location on the operating fork, for repair needs or for maintenance of other vehicle mechanisms, and remounted in the said location.

Figure 7:
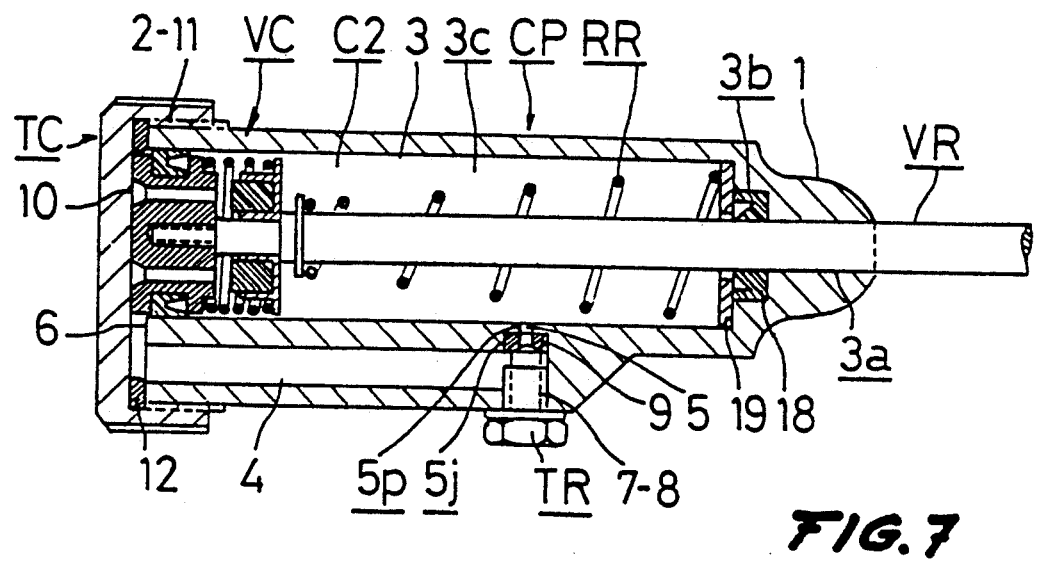
FIG. 7 is a cross section view of the device of the invention, showing the position occupied by the piston when the said device is removed from the motor vehicle.

Under these conditions, the device operates as follows:

FIG. 7 shows how once the device is removed from its location on the operating fork, the control spring RR is fully expanded and the shut-off valve VC is open.

Figure 8:
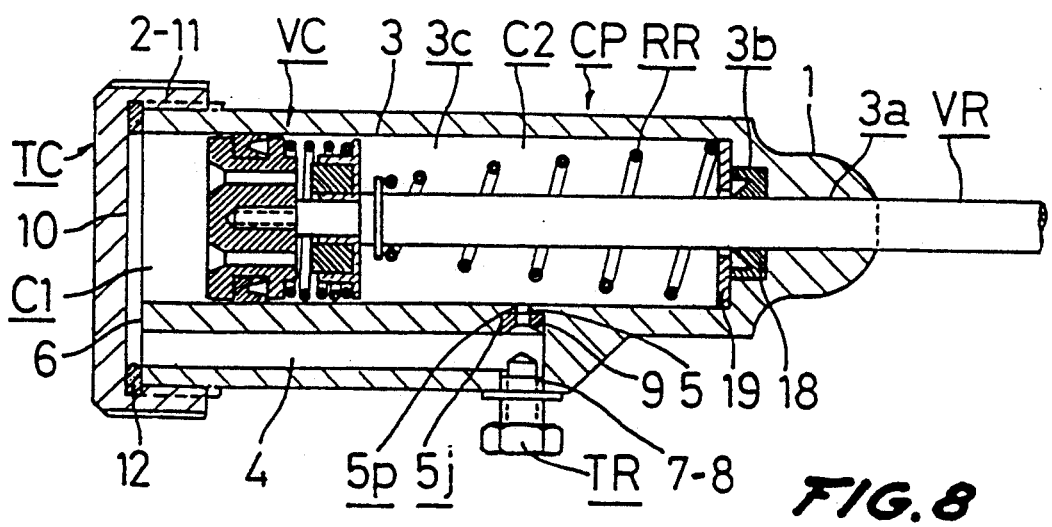
FIG. 8 is a cross section view of the device of the invention, showing the action of the regulator when said device is reassembled in the motor vehicle.

To remount the device of the invention in its location on the said fork, the control screw TR must be operated to place the chambers $c_1$ and $c_2$ in communication with each other through the access provided by the passage 4, the through hole 5 and the notch 6 provided for this purpose in the main housing CP, as shown in FIG. 8

In this way, during the assembly of the device in its location on the pressure plate fork, the liquid contained in the chamber $c_2$ may flow to the chamber $c_1$ through the said passage means to the extent determined by the final position of the valve VC depending on the wear of the clutch plate lining Once these operations have been carried out, the control screw TR must be screwed in to close the fluid passage between the chambers $c_1$ and $c_2$ through the said means, the device being placed in this way in normal operating condition.

Figure 9:
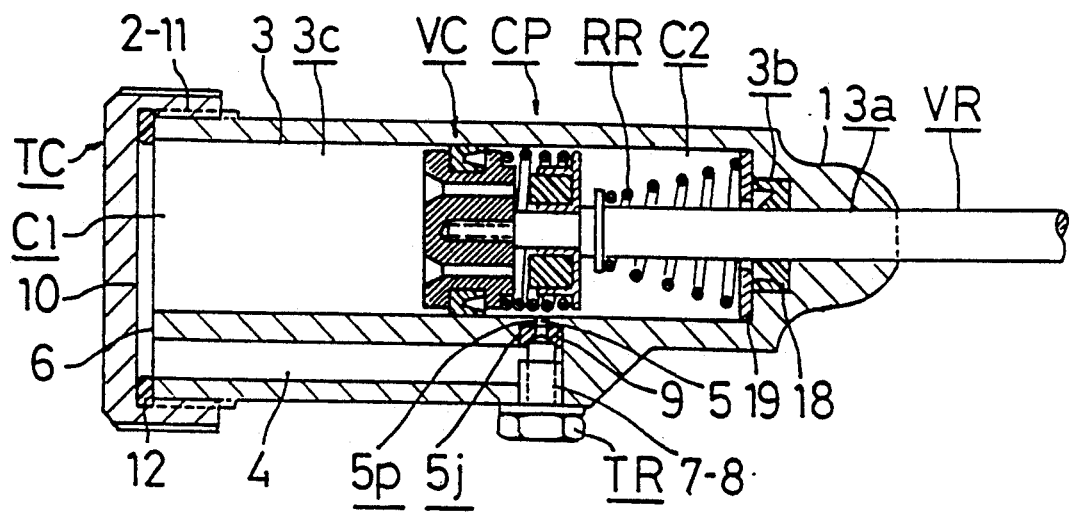
FIG. 9 is a cross section view of the device of the invention, showing the position occupied by the piston when the clutch plate lining is almost completely worn down.

The progressive wear of the clutch plate lining causes the portion of the adjusting rod VR contained in the main housing CP to shorten as said wear increases, FIG. 9 showing the position occupied by the shut-off valve VC when the clutch plate lining has practically worn away.

On the other hand, as described above, FIGS. 10 and 11 show the embodiment of the hydraulic self-adjusting device for clutch control cables of the invention in which the device is supplied from origin with the control spring RR expanded. This embodiment also incorporates the preferred embodiment of the shut-off valve VC.

Under these premises, the device of the invention operates as follows:

FIG. 10 shows how the self-adjusting device is supplied from origin with the control spring RR expanded. Under these conditions the shut-off valve VC is open as a result of the opening spring 26 pressing against the shut-off member 25

As described above, the assembly of this embodiment of the device in the automobile requires the length of the sheathed steel cable linking the clutch mechanism with the operating pedal therefor to be adjusted initially by a pertinent adjusting device from among the many available on the market The control spring RR provided in the self-adjusting device of the invention is dimensioned so that the action of the additional adjusting device during the said sheathed cable length adjustment operation does not modify the portion of the adjusting rod VR contained in the main housing CP. Thereby once the said adjustment has been carried out, the self-adjusting device of the invention becomes operative in the way described for the previous embodiment FIG. 10 shows an intermediate position of the shut-off valve VC when the clutch plate lining has worn away to a certain extent.

When the embodiment of the device of the invention whose operation has been described in the immediately foregoing paragraphs has to be removed from its location on the pressure plate operating fork, for reasons similar to those described above, the shut-off valve VC would occupy the position shown in FIG. 10. From this position the self-adjusting device would become operative again once remounted in said location and after adjustment of the length of the sheathed steel cable linking the clutch mechanism with the operating pedal therefor.

It will be understood that each of the elements described above, or two or more together, may also find a useful application in other types of construction differing from the types described above.

While the invention has been illustrated and described as embodied in a hydraulic self-adjusting device for clutch control cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said other end of said control spring permanently urging said adjusting rod indirectly through a bearing against said piston.

2. A hydraulic self-adjusting device as defined in claim 1; and further comprising an end cap closing said open front port of said front end of said main housing, said end cap having a compensator for variations of volume caused in an interior of said main housing by a length variation of a portion of said adjusting rod contained in said main housing during the operation of the device.

3. A hydraulic self-adjusting device as defined in claim 1, wherein said adjusting rod has an internal portion provided with an annular flange.

4. A hydraulic self-adjusting device as defined in claim 3, wherein said annular flange of said internal portion of said adjusting rod has a support surface for supporting said control spring.

5. A hydraulic self-adjusting device as defined in claim 1, wherein said main housing has an inner wall; and further comprising a sealing gasket and a thrust member which when said shut-off valve is closed by said thrust member presses against said sealing gasket so as to increase a pressure of said sealing gasket against said inner wall of said main housing.

6. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said piston forming inside said main housing one chamber formed between said piston and said front end of said housing and another chamber formed between said piston and said rear end of said housing, said housing having an inside wall and an outside wall forming therebetween a longitudinal conduit-like orifice with two end communicating with said chambers respectively, and also a transverse through hole extending through said outside wall of said main housing; and a control valve arranged in said transverse through hole, said conduit and said inside wall of said main housing establishing communication between an outside and an inside of said housing in said chamber located between said piston and said rear end of said main housing.

7. A hydraulic self-adjusting device as defined in claim 6, wherein said other end of said control spring permanently urges said adjusting rod directly against said piston.

8. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod; an end cap closing said open front port of said front end of said main housing, said end cap having a compensator for variations of volume caused in an interior of said main housing by a length variation of a portion of said adjusting rod contained in said main housing during the operation of the device, said compensator having an axial recess limited by a bottom, a compensator piston, a compensator spring arranged in said axial recess ad having ends bearing permanently against said bottom and said piston respectively, and a membrane so that said piston compresses the fluid contained in said main housing through said membrane.

9. A hydraulic self-adjusting device for clutch control cables, comprising a hollow elongate main housing having a front end closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said adjusting rod having an internal portion provided with an annular flange, said annular flange of said internal portion of said adjusting rod having a support surface for supporting said control spring and delimiting a movement of said shut off member of said shut-off valve.

10. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said adjusting rod having an inner end provided with a screw thread for attaching said passage member of said shut-off valve.

11. A hydraulic self-adjusting device as defined in claim 9, wherein said adjusting rod has a smaller diameter portion associated with said screw thread and defining a step to define movements of said shut-off member of said shut-off valve.

12. A hydraulic self-adjusting device as defined in claim 10, wherein said step also urges said shut-off member against said passage member of said shut-off valve.

13. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said passage member being substantially cylindrical and has an axial hole provided with a screw thread for attaching to said adjusting rod, said passage member having a concentric groove and a sealing gasket accommodated in said groove, said passage member also having an end facing said adjusting rod and provided with a smaller diameter cylindrical extension having a base, said passage member further having a plurality of longitudinal through holes equidistant from a center line of said passage member and centered around said base of said extension.

14. A hydraulic self-adjusting device as defined in claim 13, wherein said shut-off member is substantially cylindrical and located coaxially around said adjusting rod so as to slide on said adjusting rod, said shut-off member being formed laterally with a peripheral flange and an end facing said passage member with a coaxial groove with a sealing gasket snugly contained in said coaxial groove and sealing said through hole of said passage member.

15. A hydraulic self-adjusting device as defined in claim 14, wherein said cylindrical extension defines a step; and further comprising an opening spring located coaxially around said adjusting rod between said passage member and said shut-off member so that one end of said opening spring bears against said passage member on said top and the other end of said opening spring bears against said perimetral flange of said shut-off member.

16. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said passage member including a base member and a guide member which are substantially cylindrical and have corresponding threads enageable with one another, said guide member having an axial hole provided with a screw thread for attaching to said adjusting rod.

17. A hydraulic self-adjusting device as defined in claim 16, wherein said base member has laterally a concentric groove and a sealing gasket located in said groove, said base member has also longitudinally a through hole defining four cylindrical portions of a decreasing stepped diameter, said cylindrical portions including a first largest diameter portion provided with a screw thread and a guide member guided in said first larger diameter portion, second and third portions containing said shut-off member and an opening spring respectively, and a fourth portion which is a fluid passage portion with an entry to said third portion forming a closing seat.

18. A hydraulic self-adjusting device as defined in claim 17, wherein said guide member has laterally a screw thread and longitudinally a plurality of through holes establishing a communication in one of said chambers of said main housing located adjacent to said guide member and said second portion of said member, said guide member having an end facing said base member and having an axial hole partially receiving said shut-off member.

19. A hydraulic self-adjusting device as defined in claim 18, wherein said shut-off member is essentially cylindrical and has an end facing said base member and having a profile mating with said closing seat formed on said entry to said third portion, said opening spring constantly pressing against a bottom of said third portion and a corresponding end of said shut-off member.

20. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said passage being substantially cylindrical and having an axial hole provided with a screw thread for attaching to said adjusting rod, said passage member having laterally a concentric groove and a sealing gasket located in said concentric groove, said passage member having longitudinally a plurality of through holes for guiding said shut off member and at least one additional through hole formed by two cylindrical portions of different diameters joined by a frustoconical portion forming a closing seat.

21. A hydraulic self-adjusting device as defined in claim 20, wherein said shut-off member is substantially cylindrical and located coaxially around said adjusting rod for sliding thereon, said shut-off member having a side facing said passage member and provided with guide pins corresponding to said through holes in said passage member and with at least one closing pin for said additional hole and having a free end which is conical to mate with said closing seat of said passage member.

22. A hydraulic self-adjusting device as defined in claim 21; and further comprising an opening spring located coaxially around said adjusting rod and having ends bearing permanently against said passage member and said shut-off member.

23. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member which is adapted to cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said passage member being substantially cylindrical and having an axial hole provided with a screw thread for attaching to said adjusting rod, said passage member having laterally a concentric groove and a sealing gasket located in said concentric groove, said passage member having an end facing said adjusting rod and having a frustoconical inlet hole forming a closing seat, said passage member having a plurality of longitudinal through holes extending between a bottom of said frustoconical inlet hole and an opposite end of said passage member.

24. A hydraulic self-adjusting device as defined in claim 23, wherein said shut-off member is essentially cylindrical and located coaxially around said adjusting rod so as to slide on said adjusting rod, said shut-off member having laterally a frustoconical surface mating with said closing seat of said passage member, said shut-off member having a side facing said passage member and provided with an axial cylindrical flange.

25. A hydraulic self-adjusting device as defined in claim 22; and further comprising an opening spring located coaxially on said adjusting rod between said passage member and said shut-off member and having ends bearing permanently against said bottom of said frustoconical inlet hole of said passage member and a step formed by said cylindrical flange of said shut-off member.

26. A hydraulic self-adjusting device for clutch control cables, comprising a hollow elongate main housing having a front end with a closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member with a cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said passage member being substantially cylindrical and having an axial hole provided with a screw thread for attaching to said adjusting rod, said passage member having laterally a plurality of longitudinal grooves, said shut-off member being attached to said passage member and located coaxially around said adjusting rod, said shut-off member being substantially cylindrical and having at an end facing said passage member a cylindrical portion of a smaller diameter and a resilient material sealing gasket snugly located in said cylindrical portion and pressing by resilient deformation against a main housing so as to prevent liquid flow between said chambers.

27. A hydraulic self-adjusting device for clutch control cables, comprising a hollow elongate main housing having a front end which is closeable open front port and a rear end with a closed rear extension, said housing containing a fluid; a piston slidable in said housing along a portion delimited by two terminal stop positions and having a passage allowing a flow of the fluid therethrough; an adjusting rod having one end passing through said rear extension of said housing; a control spring permanently urging said adjusting rod so that the clutch mechanism control cable is pulled, said adjusting rod extending to an outside only at said rear end of said main housing while the other end of said adjusting rod remains permanently in said main housing and is fixedly attached to said piston, said passage of said piston being provided with a shut-off valve formed by a passage member fixedly attached to said adjusting rod and by a shut-off member with a cut off the fluid flow through said passage member depending on movements of said adjusting rod, said control spring being contained in said main housing coaxially with said adjusting rod so that one end of said control spring bears against said rear end of said housing and the other end of said spring permanently urges said adjusting rod with said piston attached to said adjusting rod, said main housing having an inner wall; a sealing gasket and a thrust member which when said shut-off valve is closed by said thrust member presses against said sealing gasket so as to increase a pressure of said sealing gasket against said inner wall of said main housing, said thrust member being substantially cylindrical and located coaxially around said adjusting rod for sliding along said adjusting rod, said thrust member having laterally a frustoconical surface mating with said sealing gasket, said thrust member having an end facing said shut-off member and provided with an axial hole, said main housing having a hole; and an opening spring located in said axial hole and arranged coaxially around said adjusting rod so that one end of said opening spring permanently presses against said shut-off member and the other end of said opening spring presses against a bottom of said hole.

* * * * *